(12) United States Patent
Seseke-Koyro et al.

(10) Patent No.: US 6,743,409 B2
(45) Date of Patent: Jun. 1, 2004

(54) ALKALI METAL FLUOROZINCATE AND METHOD FOR PRODUCING IT

(75) Inventors: Ulrich Seseke-Koyro, Isernhagen (DE); Andreas Becker, Lachendorf (DE); Joachim Frehse, Hannover (DE)

(73) Assignee: Solvay Fluor and Derivative GmbH, Hannover (DE)

( * ) Notice: Subject to any disclaimer, the term of this patent is extended or adjusted under 35 U.S.C. 154(b) by 14 days.

(21) Appl. No.: 10/262,612

(22) Filed: Oct. 2, 2002

(65) Prior Publication Data

US 2003/0086861 A1 May 8, 2003

Related U.S. Application Data

(63) Continuation of application No. PCT/EP01/03509, filed on Mar. 28, 2001.

(30) Foreign Application Priority Data

Apr. 3, 2000 (DE) .......................................... 100 16 257

(51) Int. Cl.$^7$ ................................................. C01G 9/00
(52) U.S. Cl. ........................... 423/464; 148/24; 148/26; 228/262.51
(58) Field of Search ................................. 423/463, 464; 148/24, 26; 228/207, 262.51

(56) References Cited

U.S. PATENT DOCUMENTS

| | | | | |
|---|---|---|---|---|
| 4,645,119 A | * | 2/1987 | Haramaki et al. | 228/183 |
| 4,880,758 A | * | 11/1989 | Heistand et al. | 423/608 |
| 6,432,221 B1 | * | 8/2002 | Seseke-Koyro et al. | 148/24 |

FOREIGN PATENT DOCUMENTS

| | | |
|---|---|---|
| JP | 61293699 | 12/1986 |
| WO | 99/48641 | 9/1999 |

OTHER PUBLICATIONS

R. J. Meyer, "Gmelins Handbuch der Anorgischen Chemie, 8. Auflage, Band 32" Verlag Chemie, p. 303.

* cited by examiner

*Primary Examiner*—Ngoc-Yen Nguyen
(74) *Attorney, Agent, or Firm*—Crowell & Moring LLP

(57) ABSTRACT

Novel methods for producing alkali metal fluorozincates, especially potassium fluorozincate. Products having defined particle size ranges are obtained depending on the sequence of introduction of the reactants alkali metal hydroxide, zinc oxide and hydrogen fluoride. The resulting alkali metal fluorozincates are particularly suitable for use as a fluxing agent or fluxing agent additive during brazing of aluminum or aluminum alloys and can be applied by wet or dry fluxing methods depending on the particle size of the alkali metal fluorozincate particles.

7 Claims, No Drawings

ALKALI METAL FLUOROZINCATE AND METHOD FOR PRODUCING IT

CROSS REFERENCE TO RELATED APPLICATIONS

This application is a continuation of international patent application no. PCT/EP01/03509, filed Mar. 28, 2001, designating the United States of America and published in German as WO 01/74715, the entire disclosure of which is incorporated herein by reference. Priority is claimed based on Federal Republic of Germany patent application no. DE 100 16 257.6, filed Apr. 3, 2000.

BACKGROUND OF THE INVENTION

The present invention relates to a method for producing alkali metal fluorozincate, to the resulting product, and to the use thereof in brazing aluminum.

Alkali metal fluorozincates, such as cesium fluorozincate and particularly potassium fluorozincate, may be used as fluxing agents for brazing aluminum components and components made of aluminum alloys. In this case, these compounds act not only as fluxing agents, but rather they produce a coating of the surface, in that zinc is deposited on the surface of the components. The fluorozincates may also be used together with alkali fluoroaluminates, for example potassium fluoroaluminate and/or cesium fluoroaluminate. These compounds also act as fluxing agents for brazing aluminum. German Published Application 199 13 111 A1 discloses these types of fluxing agents and their use. The production of alkali metal fluorozincates according to this published application is achieved by melting together alkali metal fluoride and zinc fluoride, by reacting alkali metal fluoride and zinc fluoride in aqueous phase, or by reacting zinc oxide with adducts of hydrogen fluoride and alkali metal fluoride.

SUMMARY OF THE INVENTION

It is an object of the invention to provide a method for producing alkali metal fluorozincates which is capable of producing products having defined grain distribution ranges.

Another object of the invention is to provide an alkali metal fluorozincate which is especially suited for use as a fluxing agent or fluxing agent component.

These and other objects are achieved in accordance with the present invention by providing a method for producing alkali metal fluorozincate from alkali metal hydroxide, zinc oxide, and alkali metal fluoride or hydrogen fluoride in aqueous phase, wherein:
  a) to produce fine alkali metal fluorozincate, alkali metal hydroxide and zinc oxide are mixed into a suspension and hydrogen fluoride is added, or
  b) to produce medium fine alkali metal fluorozincate, hydrogen fluoride and zinc oxide are mixed with one another and alkali metal hydroxide is added, or
  c) to produce coarse alkali metal fluorozincate, hydrogen fluoride and zinc oxide are mixed with one another and alkali metal fluoride is added.

In accordance with a further aspect of the invention, the objects are achieved by providing a fine alkali metal fluorozincate produced by the method of claim 1, and having a grain spectrum in which 50% of all particles have a diameter <5 $\mu$m, or a medium fine alkali metal fluorozincate produced by the method of claim 1, and having a grain spectrum in which 50% of all particles have a diameter <11 $\mu$m, or a coarse alkali metal fluorozincate produced by the method of claim 1, and having a grain spectrum in which 50% of all particles have a diameter >11 $\mu$m.

In accordance with yet another aspect of the invention, the objects are achieved by providing a method of fluxing an aluminum or aluminum alloy component for brazing, said method comprising applying to said component a fluxing agent comprising an alkali metal fluorozincate produced as described above.

The present invention is based on the recognition that alkali metal fluorozincate having specific grain size properties may be produced as a function of the type of starting compounds and the sequence in which the starting reactants are brought into contact with one another.

The method according to the present invention for producing alkali metal fluorozincate from alkali metal hydroxide, zinc oxide, and alkali metal fluoride or hydrogen fluoride in aqueous phase is distinguished in that
  a) to produce fine alkali metal fluorozincate, alkali metal hydroxide and zinc oxide are mixed into a suspension, and hydrogen fluoride is added, or
  b) to produce medium fine alkali metal fluorozincate, hydrogen fluoride and zinc oxide are mixed with one another, and potassium hydroxide is added, or
  c) to produce coarse alkali metal fluorozincate, zinc oxide and hydrogen fluoride are mixed with one another, and alkali metal fluoride is added.

Instead of zinc oxide, other zinc compounds, e.g., zinc hydroxide, zinc carbonate, or zinc chloride, may be used. However, zinc oxide is preferred.

In the context of the present invention, the term "fine" refers to an alkali metal fluorozincate in which 50% of the particles have a particle size smaller than 5 $\mu$m and 90% of the particles have a particle size of less than 9 $\mu$m; the remaining particles are then the same size or larger than the indicated values. Fine alkali metal fluorozincate is preferably produced in which 50% of all particles have a diameter of <3.8 $\mu$m and 90% of all particles have a diameter of <8 $\mu$m. The size is determined using laser diffraction.

Within the context of the present invention, the term "medium fine" refers to a product in which 50% of the particles of the material produced have a grain size of less than 11 $\mu$m and 90% have a grain size of less than 27 $\mu$m. The diameters of the remaining particles are at or above the listed values. "Medium fine" preferably means that 50% of all particles produced have a grain size of less than 10 $\mu$m and 90% of all particles have a grain size of less than 26 $\mu$m. The particle size analysis is again carried out by laser diffraction.

In the context of the present invention, the term "coarse" means that 50% of all particles have a grain size of less than 22 $\mu$m and 90% have a grain size of less than 40 $\mu$m. The term "coarse" preferably means that 50% of all particles have a grain size of, less than 21 $\mu$m and 90% have a grain size of less than 39 $\mu$m. The diameters of the remaining particles correspond to the recited dimensions or lie below them.

Alkali metal hydroxide, hydrogen fluoride, and alkali metal fluoride advantageously are used in the form of an aqueous solution. The preferred alkali metal is potassium.

In the first variant of the method according to the present invention, fine alkali metal fluorozincate is formed. The fine alkali metal fluorozincate preferably is then isolated and dried. Surprisingly, the resulting product is finer than the product which results according to the method described in German Published Application 199 13 111. For example, alkali metal fluorozincate having a grain spectrum in which 50% of all particles have a diameter of <5 $\mu$m (measured by laser diffraction) may be produced in this way.

Preferably, the procedure starts with potassium hydroxide as an alkali hydroxide and produces potassium fluorozincate. In this case, the potassium hydroxide is preferably used in the form of an aqueous potassium hydroxide solution. The concentration of KOH in this potassium hydroxide solution is advantageously in the range from 10 to 50 weight-percent.

KZnF$_3$ is particularly preferably produced. For this purpose, potassium hydroxide, zinc oxide, and hydrogen fluoride are preferably used in quantities such that the atomic ratio of K:Zn is in the range from 1:1±0.05 and the atomic ratio of (K+Zn):F is in the range from 1:3±0.05. The zinc oxide may also be replaced by a zinc oxide precursor, for example, ZnCO$_3$ or ZnCl$_2$.

A suspension is formed, which then reacts further with hydrogen fluoride to obtain the desired alkali metal fluorozincate. Preferably, a hydrofluoric acid solution is used containing 10 to 99 weight-percent HF, preferably 20 to 40 weight-percent HF.

The suspension of alkali metal hydroxide and zinc oxide is preferably produced at a temperature in the range from 15 to 85° C., particularly at ambient temperature (approximately 20° C.). The resulting intermediate product is advantageously reacted with hydrogen fluoride at a temperature in the range from approximately 20° C. to 90° C.

In the second variant of the present invention, medium fine alkali metal fluorozincate is produced. Hydrogen fluoride and alkali hydroxide are preferably used as an aqueous solution. The preferred concentrations correspond to those of the first variant. Alkali preferably is represented by potassium. Hydrogen fluoride and zinc oxide, which may be used in precursor form as zinc carbonate, for example, are reacted at a temperature in the range from 20° C. (ambient temperature) to 95° C. The subsequent reaction with the hydroxide is preferably carried out at a temperature in the range from 70° C. to 90° C.

For the third variant, in which coarse alkali metal fluorozincate is produced, hydrogen fluoride is initially reacted with zinc oxide, and then alkali metal fluoride is added. In this case as well, alkali preferably is represented by potassium. Hydrogen fluoride is preferably used in aqueous solution, the preferred concentration being as in the first variant. The alkali metal fluoride is also preferably used in aqueous solution. The preferred alkali metal fluoride concentration lies in the range from 25 to 40 weight-percent, particularly 28 to 32 weight-percent. The temperature of the first reaction step is in the same range as in variant 1 and variant 2. The addition of alkali metal fluoride is then preferably carried out at a temperature of 70° C. to 90° C.

As noted above, the invention also relates to the fine, medium fine, and/or coarse alkali metal fluorozincate, obtained according to the variants of the method according to the present invention, having the further parameters indicated above in regard to the grain size. Potassium fluorozincate is preferred, particularly potassium fluorozincate of the formula KZnF$_3$. In this case, the grain sizes of the fine product—in relation to 50% of the particles, d$_{x50}$—are in the range from 3 to 5 µm, those of the medium fine product are in the range from 6 to 11 µm, and those of the coarse product are in the range from 12 to 25 µm. Experiments have shown that it is possible to produce potassium fluorozincate, for example, having an even finer grain spectrum (e.g., 50% of the particles having a diameter of less than 3.3 µm).

If a mixture of potassium hydroxide and rubidium, lithium, or cesium hydroxide is used, corresponding mixed fluorozincates of the type alkali$_{1-x}$alkali'$_x$ZnF$_3$ (x<1 and alkali not equal to alkali') may be produced. These mixed fluorozincates are also a subject of the present invention. In the case of mixed fluorozincates, potassium-cesium fluorozincate (the ratio of potassium to cesium being arbitrary) is preferred.

The fluorozincates according to the present invention are particularly suitable for use as a fluxing agent for brazing aluminum and aluminum alloys. They are then used in a known way, for example, as disclosed in German Published Application 199 13 111. The fine product is particularly suitable for application through wet fluxing, the coarse product for application by dry fluxing. The medium fine product is well suited for both purposes. Of course, mixtures having predetermined properties may also be produced.

The fluorozincates of the invention are also suitable for use as a solder fluxing agent additive for other fluxing agents, particularly as a fluxing agent additive for potassium fluoroaluminate and cesium fluoroaluminate.

The alkali metal fluorozincate according to the present invention may, of course, also be mixed with alkali metal fluorozincate produced in typical ways, in order to influence properties such as suspensibility or fluidizability.

For example, the alkali metal fluorozincate of the invention may be used mixed with solder metal, or with a precursor for a solder metal, for example with 5–95 weight-percent, relative to the total fluxing agent, of alkali metal fluorosilicate such as potassium hexafluorosilicate, see European Patent Application 810 057 and German Published Application 196 36 897, or with 10 to 80 weight-percent of copper, zinc, or germanium, which form a eutectic mixture with aluminum, see U.S. Pat. No. 5,190,596.

The alkali metal fluorozincate of the invention may also be used in a mixture with alkali fluoroaluminates, for example, with KAlF$_4$ or K$_2$AlF$_5$, as is analogously described in German Published Application 199 13 111, or with cesium fluoroaluminate. The latter is advantageous for Al alloys having larger proportions of Mg.

Further auxiliary agents may be included, for example, as described in German Published Application 199 13 111, p. 3. For example, binders or dispersing agents may be included.

The fluxing agent may be applied in a known way to the components made of aluminum or aluminum alloys to be bonded. Dry application on the basis of electrostatic spraying technology is possible due to the good fluidizing properties of the fluxing agent. Alternatively, the fluxing agent may be applied in the form of aqueous and/or organic suspensions or as a paste to the materials to be bonded. Aqueous or organic slurries advantageously contain 15 to 75 weight-percent of the fluxing agent. Suspensions of the fluxing agent in organic liquids, expediently the substances typically used as organic solvents, such as alcohols, particularly methanol, ethanol, propanol, or isopropanol, as well as polyols, may also be used. Other organic liquids ("carriers") include ethers, for example, diethylene glycol monobutyl ether, ketones such as acetone, and esters of alcohols, diols, or polyols. An example of a binder for application as a paste is ethyl cellulose. Using film farmers, typically polymers which are soluble in organic solvents, e.g., acetone, fluxing agent may be applied, possibly with brazing metal or solder precursors, onto the workpiece and produce a strongly adhering film after evaporation of the solvent. Suitable polymers include, for example, (meth)acrylates. During brazing, the film former vaporizes.

During application, the brazing metal, if it is necessary, may be contained in the fluxing agent (as an admixed powder), it may already be applied as a plating on the components to be brazed, or it may be applied in addition to the fluxing agent.

The brazing temperature is a function of the brazing material used or the metal or material forming the brazing material. Below a solder metal liquidization temperature of 450° C., according to the definition, one refers to soft soldering (="soldering"), above this, to hard soldering (="brazing"). There are low melting solders, such as zinc-aluminum solders, which may be used from 390° C., or pure zinc solder, which may be used from 420° C. for soldering. Other solders may be brazed at higher temperatures. Al—Si—[Cu] solders may be used from [530° C.] or 577° C., respectively.

In general, a brazing temperature of 600° C. is sufficient. Preferably, soldering or brazing is performed from 390° C.

to 600° C., particularly from 420 to 590° C. Ambient pressure is used in this case. It is also possible to braze, for example, in vacuum, with vaporization of the fluxing agent, as described in Japanese Patent Application 03/099795, is also possible. Flame or furnace soldering may also be carried out, particularly in inert atmosphere (e.g., $N_2$ atmosphere).

EXAMPLE 1

Fine Product

Reaction: $KOH + ZnO + 3HF \rightarrow KZnF_3 + 2H_2O$

Batch:

| | | |
|---|---|---|
| 1) | 0.5 ml KOH solution 45.2% w/w | 62.3 g |
| | ZnO (99.9 cm Aldrich) | 40.9 g |
| | completely desalinated water (CD water) | 30.6 ml |
| 2) | HF solution 49.6% w/w | 60.6 g |
| | CD water | 60.6 ml |
| | cooling CD water | 33 ml |

Procedure:

62.3 g of the 45.2% KOH w/w was diluted with 30.6 ml of CD water and subsequently 40.9 g of ZnO was added and slurried while being stirred. An HF solution made of 60.6 g of the 49.6% HF solution and 60.6 g of CD water was then introduced from a dropping funnel within 90 seconds. The temperature rose from 24.6° C. to 85.9° C. For cooling, 33 ml of CD water was added. The mixture was then stirred for one hour at 80° C., the precipitate was filtered off and dried for four hours at 180° C.

Yield: quantitative
XRD=$KZnF_3$
Grain size (laser diffraction):
$X_{50}$=3.28 μm
$X_{90}$=6.98 μm

EXAMPLE 2

Medium Fine Product

The product was produced as described in Example 1 with the exception that batch 1 was produced by reacting HF solution with zinc oxide, and batch 2 was the KOH solution.

Grain size
$X_{50}$=9.47 μm
$X_{90}$=25.75 μm

EXAMPLE 3

Coarse Product

The produce was produced as described in Example 1 with the exception that batch 1 was produced by reaction of HF solution with zinc oxide, and batch 2 was a solution of KF in water.

Grain size $X_{50}$=20.50 μm
Grain size $X_{90}$=38.18 μm

EXAMPLE 4

Use for Brazing

A triturate of 3 g of the substance from Example 1 with isopropanol was applied to a 25×25 mm aluminum sheet, which was plated with AlSi solder, and an aluminum angle was placed on top. This assembly was thermally treated in a laboratory brazing oven in accordance with the Nocolok® brazing process conditions. The brazing of the assembly was 100%.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method for producing alkali metal fluorozincate from alkali metal hydroxide, zinc oxide, and alkali metal fluoride or hydrogen fluoride in aqueous phase, wherein:

a) to produce fine alkali metal fluorozincate, alkali metal hydroxide and zinc oxide are mixed into a suspension and hydrogen fluoride is added, or b) to produce medium fine alkali metal fluorozincate, hydrogen fluoride and zinc oxide are mixed with one another and alkali metal hydroxide is added, or c) to produce coarse alkali metal fluorozincate, hydrogen fluoride and zinc oxide are mixed with one another and alkali metal fluoride is added.

2. A method according to claim 1, for producing fine alkali metal fluorozincates, wherein alkali metal hydroxide is mixed into a suspension with zinc oxide in aqueous phase, and the suspension is reacted with hydrogen fluoride to form fine alkali metal fluorozincate.

3. A method according to claim 1, wherein the alkali metal hydroxide is potassium hydroxide and potassium fluorozincate is produced.

4. A method according to claim 1, wherein potassium hydroxide is used in the form of as an aqueous potassium hydroxide solution.

5. A method according to claim 3, wherein the atomic ratio of K:Zn is in the range from 1:1±0.05, and the atomic ratio of (K+Zn):F is in the range from 1:3±0.05.

6. A method according to claim 1, further comprising isolating and drying the alkali metal fluorozincate produced.

7. A method according to claim 2, wherein the suspension of alkali metal hydroxide and zinc oxide is produced at a temperature in the range from 15 to 85° C., and the suspension subsequently is reacted with hydrogen fluoride at a temperature up to 90° C.

* * * * *